US006615941B2

(12) United States Patent
Lo

(10) Patent No.: US 6,615,941 B2
(45) Date of Patent: Sep. 9, 2003

(54) ELECTRIC WHEELCHAIR SIMULTANEOUS GEAR CHANGE STRUCTURE

(76) Inventor: Chen-Chuan Lo, P.O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/924,728

(22) Filed: Aug. 9, 2001

(65) Prior Publication Data

US 2003/0029655 A1 Feb. 13, 2003

(51) Int. Cl.[7] .................................................. B60K 1/00

(52) U.S. Cl. .................... 180/65.6; 180/907; 74/473.1; 192/49

(58) Field of Search .............................. 180/65.5, 65.6, 180/65.7, 907, 337; 74/473.1, 473.3, 471 R, 480; 192/48.1, 49, 50

(56) References Cited

U.S. PATENT DOCUMENTS 3,100,547 A * 8/1963 Rosenthal .................. 180/6.5
3,901,337 A * 8/1975 Cragg ....................... 180/6.5
4,037,676 A * 7/1977 Ruse ......................... 180/6.5
RE29,414 E * 9/1977 Prokop ...................... 74/473.3
4,615,233 A * 10/1986 Lasoen ..................... 74/473.1
5,135,063 A * 8/1992 Kropf .......................... 180/13
5,197,559 A * 3/1993 Garin et al. ............... 180/65.1
5,417,126 A * 5/1995 DeCrouppe et al. ....... 74/473.1
5,481,935 A * 1/1996 Bailly et al. ............... 74/473.1
5,495,904 A * 3/1996 Zwaan et al. ................. 180/11
5,562,174 A * 10/1996 Chen ......................... 180/65.5
6,059,060 A * 5/2000 Kanno et al. .............. 180/65.8
6,378,883 B1 * 4/2002 Epstein .................... 280/250.1
6,408,961 B1 * 6/2002 Chen .......................... 180/6.5

* cited by examiner

*Primary Examiner*—Brian L Johnson
*Assistant Examiner*—Kelly E Campbell
(74) *Attorney, Agent, or Firm*—Troxell Law Office PLLC

(57) ABSTRACT

An electric wheelchair simultaneous gear change structure, comprising a structure that includes two separate oscillating plates, oscillating plate one and oscillating plate two, as well as hinge connectors placed on either end of the central connecting shaft connecting oscillating plate one and oscillating plate two. One end of oscillating plate one is a hinge connection connecting to an outer connecting rod, and the other end of the outer connecting rod is connected by a hinge connector to the gearshifts, so that when a pulling motion is made on the gearshifts it acts to pull on the oscillating plate on the outer connecting rod, so that oscillating rod two on the central connecting rod is made to move simultaneously, and in this way two engine boxes are acted on simultaneously.

2 Claims, 4 Drawing Sheets

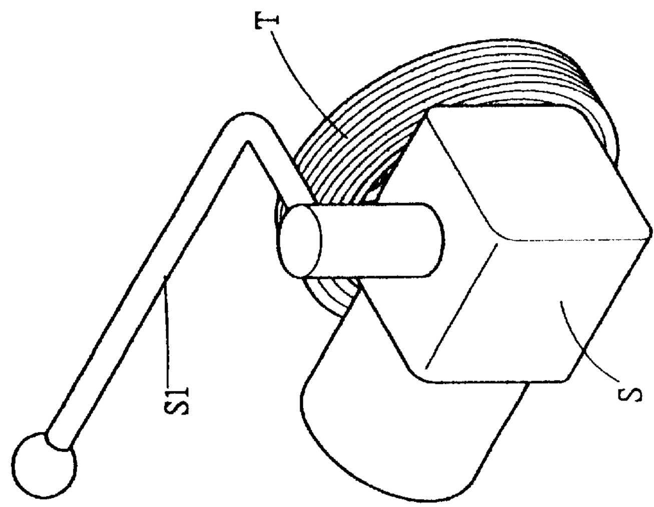
FIG.1
Prior Art
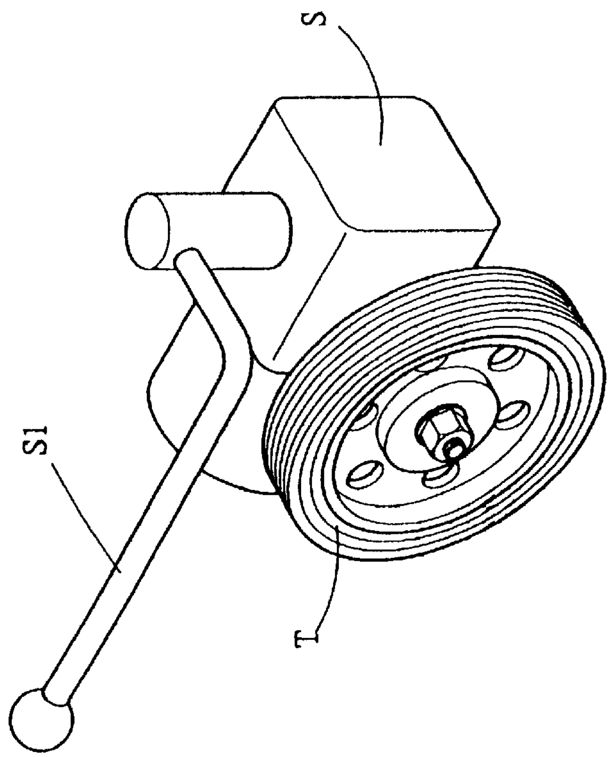

ELECTRIC WHEELCHAIR SIMULTANEOUS GEAR CHANGE STRUCTURE

BACKGROUND OF THE INVENTION

1. Field of the Invention

The present invention is related to an electric wheelchair simultaneous gear change structure, more particularly, an electric wheelchair structure that allows for a process whereby when one hand is used to pull a gearshift the effect is registered on the engine boxes on both sides of the wheelchair.

2. Description of the Prior Art

As is shown in FIG. 1 showing the structure of an electric wheelchair's back wheels, engine boxes (S) are placed on an electric wheelchair's left and right hand side wheel body (T), and on both the left hand and right hand of the wheel body, gearshifts are installed (S1), so that the user is able to utilize gearshift (S1) by switching to a neutral gear of the electrical wheelchair, or to make use of a hand pushing motion to control an electric gear.

Thus, for conventional wheelchairs controlling the motion of the wheelchair involves many inconveniences of operation, one of these being that to effect a gear change it is necessary to stop or get out of the electric wheelchair, as switching gear involves utilizing the two gearshifts (S1) to effect a gear change in the two engine boxes (S) in order to control the electric wheelchair. This arrangement does not only cause inconvenience (gears in both engine boxes must be changed simultaneously) for the user, it can also result in potential danger; one handed operation can mean that the user may twist his or her body around to operate a control, and in this way upset the electric wheelchair's balance, causing it to fall over.

SUMMARY OF THE INVENTION

The present invention utilizes two gearshift axle rods, on one of these oscillator plate one has been firmly connected and on the other of these oscillator plate two has been firmly connected. On the central connecting rod there are two hinge connectors to connect oscillating plate one and oscillating plate two, and on the other end of oscillating plate one there is hinge flange connecting it to the outer connecting rod, which is connected on its other end to a gearshift via a hinge connection, so that when the gears are pulled the outer connecting rod pulls to move oscillating connector one, and oscillating plate two on the central connecting rod moves simultaneously, so that in this way both engine boxes change gear simultaneously, which is the main object of the present invention.

BRIEF DESCRIPTION OF THE DRAWINGS

FIG. 1: Shows structure of back wheels of conventional electrical wheelchair.

DETAILED DESCRIPTION OF THE PREFERRED EMBODIMENTS

Figure 2:
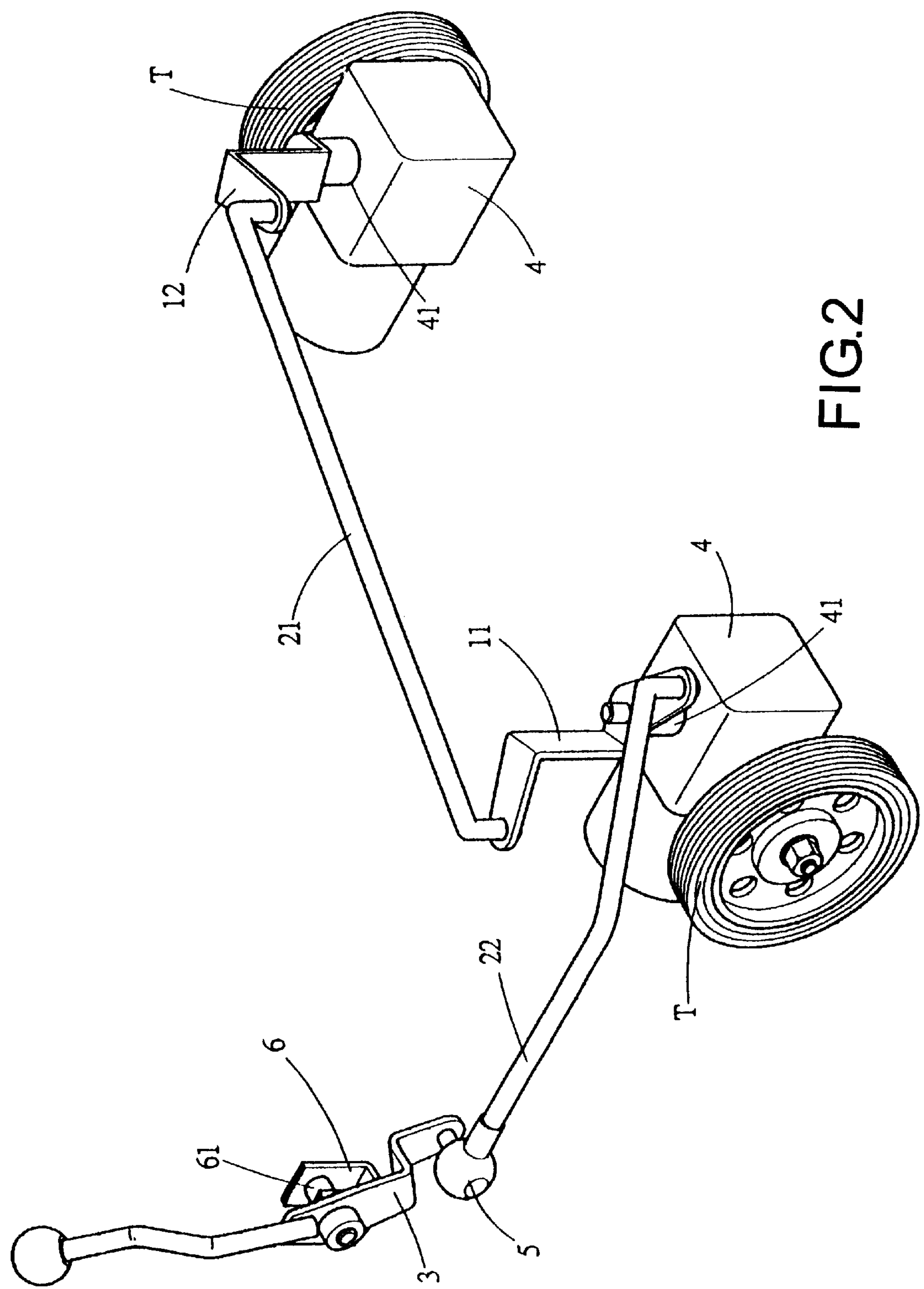
FIG. 2: Shows exterior view of the present invention's preferred embodiment.

FIG. 2 represents the basic structure of the present invention. The important part of the structure is the mechanism on an electric wheelchair's engine boxes allowing for simultaneous gear change, wherein engine boxes (4) are located on both sides of wheelchair body (T), and on these engine boxes (4) gearshift axle rods (41) have been installed. The main point here being that oscillation plate one (11) and oscillation plate two (12) have been installed on these gearshift axle rods, and that oscillation plate one (11) and oscillation plate (12) are connected by hinge connectors to a central connecting rod (21). Oscillation plate one (11) is connected to an outer connecting rod (22), which in turn is connected by a hinge connector to a gearshift (3). In order to meet the practical requirements of wheelchair body assembly, a hinge axle (61) is connected by a hinge connector to an axle stand (6), so that when the operator makes a pulling motion the gearshift (3) and the outer connecting rod (22) are able to connect via a universal connector (5), thus making the connection motion flow more smoothly.

Figure 3:
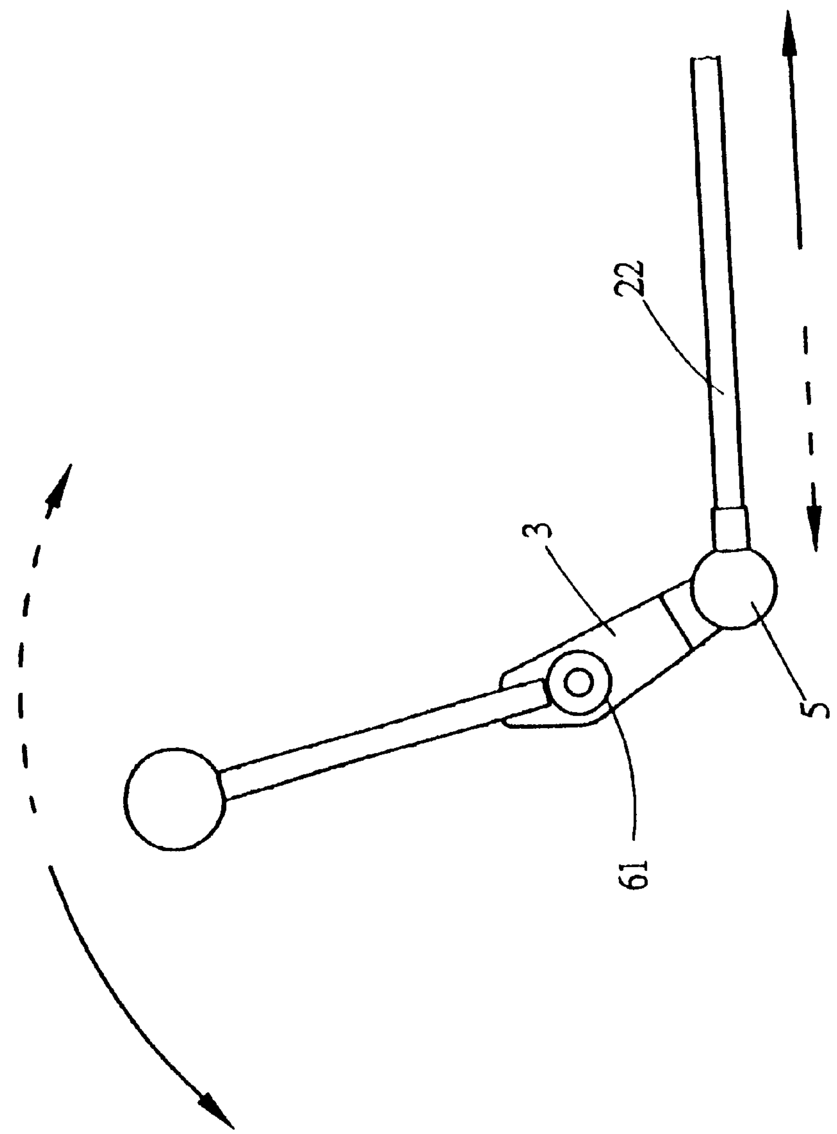
FIG. 3: Shows movement of gears of present invention.
Figure 4:
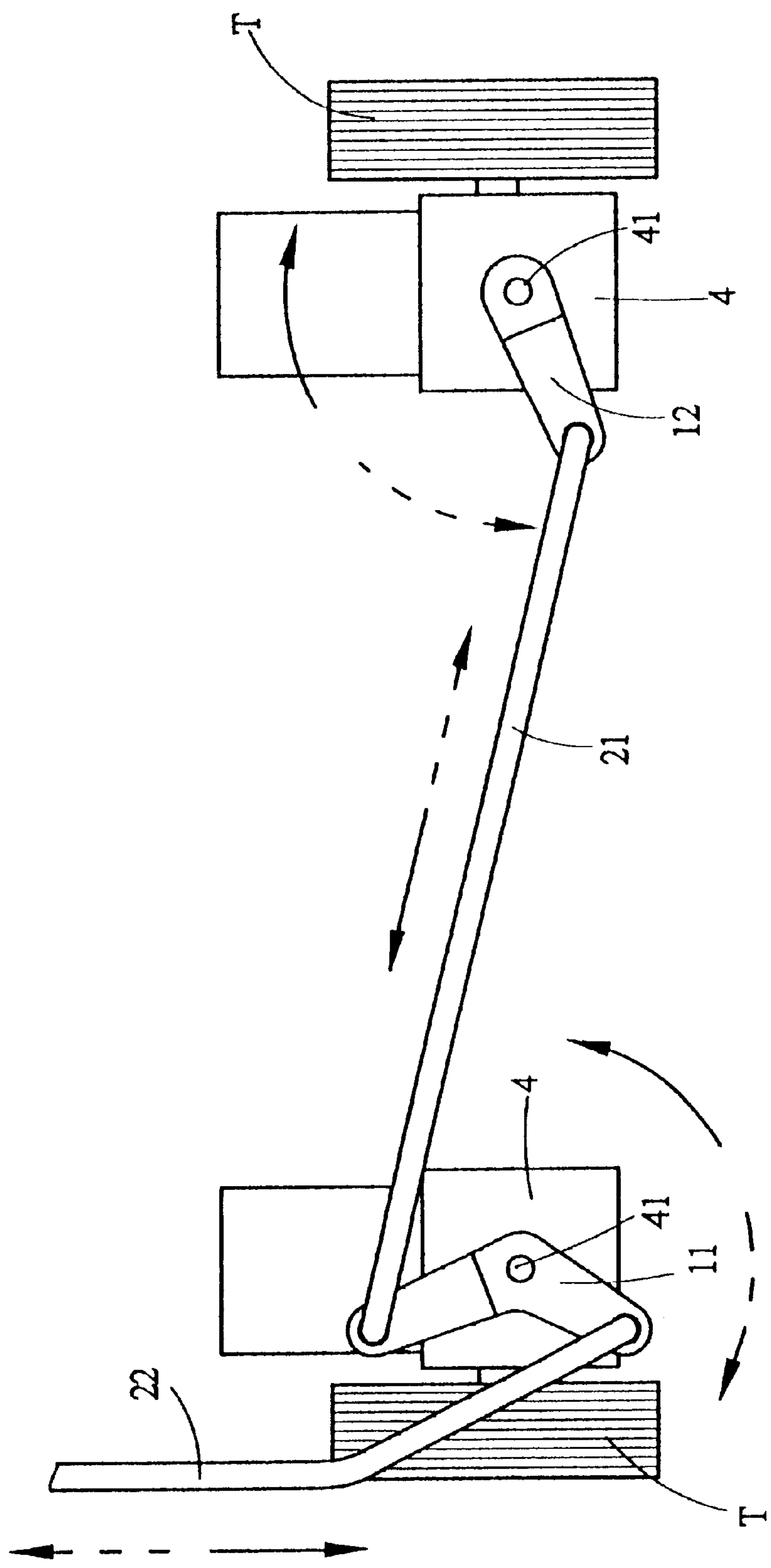
FIG. 4: Shows simultaneous movement of engine boxes of present invention.

Please refer to FIG. 3 and FIG. 4. When the operator pulls on gearshift (3) this acts to pull the outer connecting rod (22), which sets in motion oscillating plate one (11), and because the central connecting rod simultaneously sets in motion oscillating plate two (12), the gearshift axle gears (41) on the two engine boxes (4) are able to turn simultaneously, which in turn acts to simultaneously activate the two engine boxes. The positioning of the gearshifts (3) can be assembled according to the practical requirements and convenience of the user, moreover, the design can be affixed or assembled onto existing wheelchair body designs, and the system whereby operation of one control acts to effect the operations of the other control in an identical way provides for a good deal more convenience of use and safety.

By way of the movement of the outer connecting rod and gearshift of the present invention, when the gearshift is pulled, the outer connecting rod will act to pull oscillation plate one, causing oscillation plate two (12) on the central connecting rod to move simultaneously, which will then produce a simultaneous and identical effect on the two engine boxes. Moreover, the connecting position of the gearshifts on both sides can be assembled so as to suit the practical requirements of the operator, and in this way increase the convenience of operation and safety of the device. Having demonstrated the feasibility of the prefered embodiment of the present invention, a formal application for a patent covering this new model is hereby made.

What is claimed is:

1. An electric wheelchair simultaneous gear change structure comprising:

a) a first and second engine box, each engine box having a gearshift axle rod, the first engine box adapted to be mounted on a first side of a wheelchair body, the second engine box adapted to be mounted on a second side of the wheelchair body;

b) a first oscillating plate fixedly connected at a point between a first and second end to the gearshift axle rod of the first engine box;

c) a second oscillating plate fixedly connected at a first end to the gearshift axle rod of the second engine box;

d) a central connecting rod having a first central connecting rod end and a second central connecting rod end, the first central connecting rod end being pivotally connected to the first end of the first oscillating plate, the second central connecting rod end being pivotally connected to a second end of the second oscillating plate;

e) an outer connecting rod having a first outer connecting rod end and a second outer connecting rod end, the first outer connecting rod end being pivotally connected to the second end of the first oscillating plate;

(f) an axle stand adapted to be connected to the first side of the wheelchair body; and (g) a gearshift having a first gearshift end and a second gearshift end, the first gearshift end being rotatably connected to the second outer connecting rod end, the axle stand being connected to the gearshift between the first and second gearshift ends.

2. The electric wheelchair simultaneous gear change structure according to claim 1, wherein the first gearshift end is rotatably connected to the second outer connecting rod end by a universal connector, and the axle stand is connected to the gearshift between the first and the second gearshift ends by a hinge axle.

* * * * *